United States Patent [19]
Litvin

[11] Patent Number: 5,342,174
[45] Date of Patent: Aug. 30, 1994

[54] FOOT FOR FANS

[75] Inventor: Charles Litvin, West Chester, Pa.

[73] Assignee: Lasko Metal Products, Inc., West Chester, Pa.

[21] Appl. No.: 197,751

[22] Filed: Feb. 16, 1994

Related U.S. Application Data

[63] Continuation-in-part of Ser. No. 970,497, Nov. 2, 1992.

[51] Int. Cl.⁵ .......................................... B64C 11/16
[52] U.S. Cl. .................................... 416/246; 248/923
[58] Field of Search ......................... 416/246, 244 R;
415/146; 248/677, 371, 188.2, 923

[56] References Cited

U.S. PATENT DOCUMENTS

| | | | |
|---|---|---|---|
| 3,784,135 | 1/1974 | Owen, Jr. | 248/923 |
| 4,368,867 | 1/1987 | Pendleton et al. | 248/923 |

FOREIGN PATENT DOCUMENTS

| | | | |
|---|---|---|---|
| 0768017 | 9/1967 | Canada | 248/188.2 |
| 2424516 | 6/1975 | Fed. Rep. of Germany | 248/188.2 |
| 0160624 | 1/1987 | Japan | 416/244 R |
| 0188373 | 3/1987 | Japan | 415/146 |

*Primary Examiner*—Edward K. Look
*Assistant Examiner*—Mark Sgantzos
*Attorney, Agent, or Firm*—Z. T. Wobensmith, III

[57] ABSTRACT

A foot for fans that is engaged in a bottom panel of a fan housing to elevate or tilt one side of the fan for air direction and which is also useful to support the housing to resist tip-over of the fan.

2 Claims, 1 Drawing Sheet

FOOT FOR FANS

CROSS REFERENCE TO RELATED APPLICATIONS

This application is a continuation in part of my prior application Ser. No. 07/970,497 filed Nov. 2, 1992 entitled FOOT FOR FANS.

BACKGROUND OF THE INVENTION

1. Field of the Invention

This invention relates to a multi-position foot for fans, of the type that is intended to elevate or stabilize an upright box type fan.

2. Description of the Prior Art

Box type fans which include an outer square or rectangular housing with openings at front and back, which contain an electric motor and fan blades are well known in the art. Millions of such fans have been sold in the United States and other countries. Examples of such fans are shown in the U.S. Pat. No. to Morse No. 1,971,827; Fladeland U.S. Pat. No. 2,073,868; Friedman U.S. Pat. No. 2,100,439; U.S. Pat. No. Ganger et al. 2,453,009; U.S. Pat. No. Owen, Sr. 3,784,135; U.S. Pat. No. Felter 4,239,459; U.S. Pat. No. Morimoto 4,350,472; U.S. Pat. No. Pendleton et al. No. 4,368,867; U.S. Pat. No. Weber Des. 135,211; U.S. Pat. No. Jones Des. 154,927 and U.S. Pat. No. Holder, Jr. Des. 253,908, in the Japanese Patents Nos. 160,624 and 188,373; Canadian Patent No. 768,017; and German Patent No. 2,424,516.

Such fans commonly include an outer housing which is of light gauge sheet metal with front and rear openings, with the openings closed off by a porous screen or grill which allows air to pass therethrough. The housing has an electric motor mounted in the center thereof, between the screens or grills, with fan blades mounted to the output shaft of the motor to draw air through the rear screen or grill and discharge it through the front screen or grill. At times, the fan may include an integral or adjustable support attached to the fan housing, which is intended to allow the housing to pivot to change air direction, or which is intended to stabilize the housing. Due to the relative height to width ratio and light weight of the housing, and under certain conditions, these fans may become unstable and tip over. While these fans are not intended to be used as a support, a person sitting on the fan housing could easily tip it over.

In addition to the stability requirements, it is also desirable to be able to raise one side of the fan to direct air from the fan at an upward angle from the horizontal, which in the prior art fans required feet which were connected to the housing by a bracket, about which the housing was rotated to deliver air at the desired angle. The prior art structures are expensive, take up excess floor space and suffer from other shortcomings. The foot of the invention provides both stability and elevation, does not suffer from the disadvantages of the prior art and provides many positive advantages.

SUMMARY OF THE INVENTION

The invention relates to a foot for fans, where the foot is a separate piece that is intended to be engaged in openings in the bottom of the housing, provide added stability to the fan in an upright position, support the fan in an inclined position, and resist tip over of the fan in the upright or the inclined position.

The principal object of the invention is to provide a foot for fans that provides extra support to resist fan tip-over and which permits elevation of one side of the fan housing.

A further object of the invention is to provide a foot for fans that is simple to install and provides positive positioning of the fan housing.

A further object of the invention is to provide a foot for fans that is easy to use, and economical to construct.

A further object of the invention is to provide a foot for fans that only requires minimum modification of existing housings for installation and use.

A further object of the invention is to provide a foot for fans that is sturdy and long lasting in use.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

It should, of course, be understood that the description and drawings herein are merely illustrative and that various modifications and changes can be made in the structure disclosed without departing from the spirit of the invention.

Like numerals refer to like parts throughout the several views.

DESCRIPTION OF THE PREFERRED EMBODIMENTS

Figure 1:
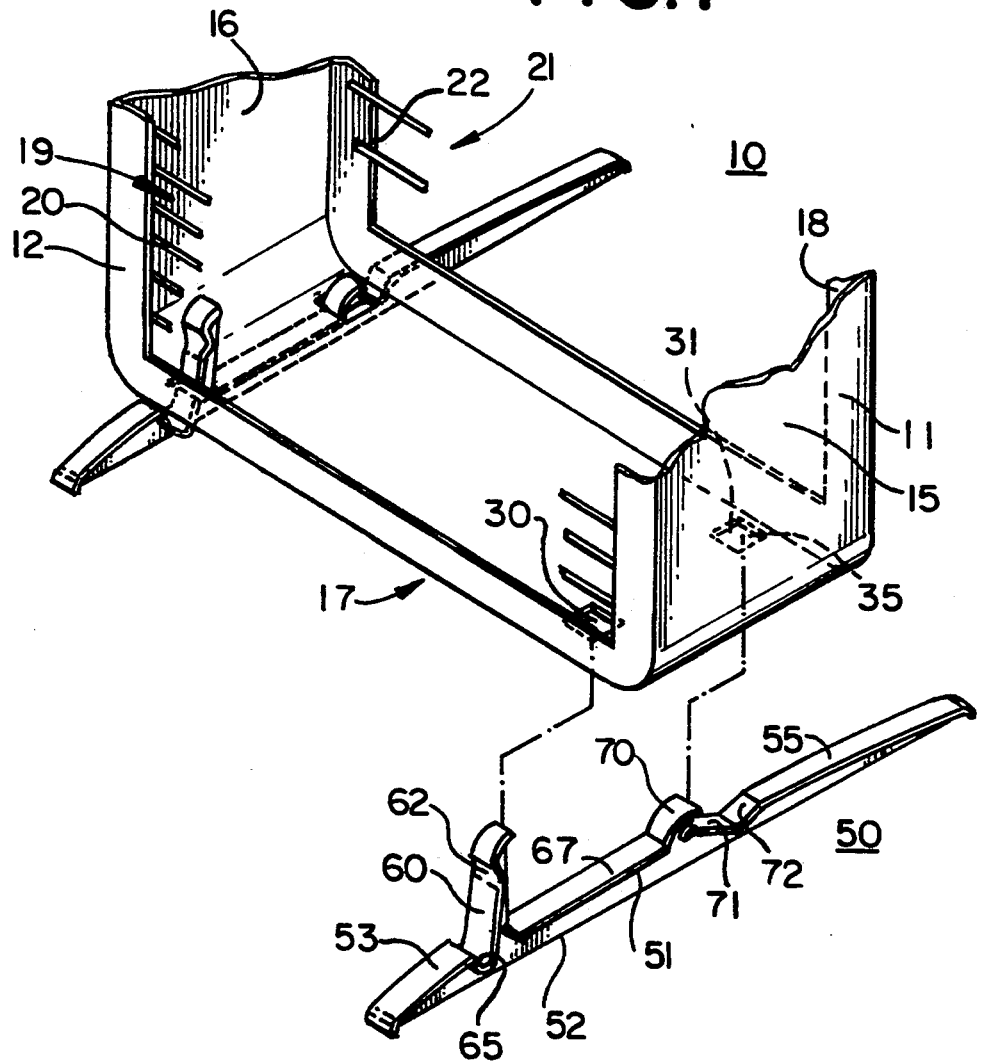
FIG. 1 is a fragmentary, partially exploded, perspective view of a fan incorporating the foot of the invention.
Figure 2:
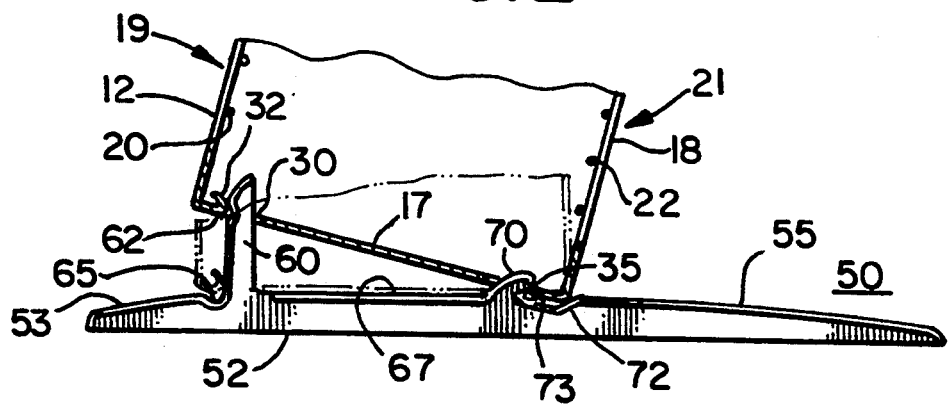
FIG. 2 is a fragmentary, sectional view, of the foot illustrated in FIG. 1, with the fan housing in an inclined position.

Referring now more particularly to the drawings and FIGS. 1 and 2, a box fan 10 of the conventional type is therein illustrated. The fan 10 includes an outer housing 11 of generally rectangular shape, which has a front panel 12, top panel (not shown), side panels 15 and 16, bottom panel 17 and a rear panel 18. The front panel 12 has an air outlet opening 19 therein of rectangular shape. A grill 20 shown in abbreviated form of well known type is provided, and attached to the front panel by conventional means such as clips (not shown). The grill 20 is constructed of plastic or metal, and permits air to pass therethrough, but restricts objects from being introduced into the interior of the housing 11. The rear panel 18 also has an air inlet opening 21 therein with a like grill 22 similar to grill 20. The housing 11 has an electric motor (not shown) mounted therein with an output shaft (not shown), to which a hub mounting a plurality of fan blades is mounted. An on/off multi-speed switch (not shown) is connected by wires (not shown) to the motor (not shown), and through a thermostat (not shown) to a source of electric power (not shown). The housing 11 is preferably formed of sheet metal.

The bottom panel 17 has two pairs of spaced square slots therein with front slots 30 adjacent front panel 12, and rear slots 31 adjacent rear panel 18. The front slots 30 have an upturned flange or rim 32 extending therealong, adjacent the front housing panel 12. The rear slots 31 have an upturned flange or rim 35 extending therealong, adjacent to the rear panel 18.

A pair of fan feet 50 are illustrated in FIG. 1, which are of a generally rectangular configuration and can be formed of molded reinforced plastic of well known type. The feet 50 each include a central body 51, with a flat bottom surface 52, which is intended to rest on an floor or other surface (not shown). The body 51 has a front portion 53, which in installed condition extends in front of panel 12 to provide stability, and a rear portion 55 which extends beyond the rear panel 18, of housing 11.

The feet 50 each have an upright finger 60 which extends upwardly from body 51, and which is intended to extend through front slot 30 into the interior of housing 11. The finger 60 is flexible, and provided with an indentation 62, to engage with rim 32 in fan inclined position as shown in FIG. 2. The foot body 51 has a front notch 65, which receives the portion 66 of bottom panel 17 in front of slot 30 in fan upright position. The body 51 has a flat surface 67 behind finger 60, which is intended to contact and support bottom panel 17 in fan upright position as shown in FIG. 1. The foot 50 has a catch 70 which extends upwardly, is of curved configuration, intended to be engaged with rim 35 of rear slot 31, and has two angularly inclined surfaces 71 and 72 behind catch 70 to engage and support the portion 73 of the bottom panel 17 between slot 31 and rear panel 18. The engagement of the finger 60 with rim 32 of slot 30 and the engagement of the catch 70 with rim 35 of rear slot 31 retains and supports the fan housing in inclined or upright position. The mode of operation is believed to be apparent from the foregoing description. It is thus believed that structure has been described with which the objects of the invention are achieved.

I claim:

1. A box fan intended to be placed on a fixed surface such as a floor, which includes an upright housing with top, bottom, front, side and rear panels, the front and rear panels having openings for air inlet and outlet, an electric motor and fan blades mounted in said housing for blowing air, the improvement for elevating and stabilizing said fan with respect to the fixed surface which comprises at least one pair of openings in the bottom panel of said housing at least one foot means for engagement with said housing said foot means includes an integral upright means extending therefrom at a substantially 90-degree right angle thereto said at least one pair of openings are at least one pair of spaced front and rear slots in said bottom panel said foot means has a body which extends past said front panel and said rear panel and selectively supports said bottom panel of said housing said foot upright means is a flexible upright finger which extends through said one of said front slots said front slot has a front rim said finger has an indentation to engage said rim of said one of said front slots to elevate and retain said fan in an elevated position above said surface said rear slot has a front rim and said body has a rearwardly extending catch which is intended to engage with said front rim of said one of said rear slots retaining the foot means therein and permitting said housing to pivot thereabout.

2. A fan as described in claim 1 in which said foot means is of molded plastic.

* * * * *